United States Patent

[11] 3,630,111

| [72] | Inventors | Lloyd Hartford;<br>Herbert Waxman, both of Northridge;<br>William I. Caldwell, Canoga Park, all of Calif. |
|------|-----------|---|
| [21] | Appl. No. | 769,199 |
| [22] | Filed | Oct. 21, 1968 |
| [45] | Patented | Dec. 28, 1971 |
| [73] | Assignee | CCI Aerospace Corporation<br>Van Nuys, Calif. |

[54] MACHINING ASSEMBLY
14 Claims, 8 Drawing Figs.

[52] U.S. Cl. .................................................. 82/15,
82/2, 82/24, 82/1, 82/25, 82/29 A
[51] Int. Cl. ...................................................... B23b 5/36,
B23b 19/02
[50] Field of Search .......................................... 82/15, 24,
25, 29.1; 29/27

[56] References Cited
UNITED STATES PATENTS

| 1,743,116 | 1/1930 | Cook | 51/42 X |
|---|---|---|---|
| 1,878,628 | 9/1932 | Foster | 29/27 |
| 1,950,039 | 3/1934 | Smith et al. | 82/24 |
| 3,008,071 | 11/1961 | Karger | 82/29.1 UX |
| 3,061,748 | 10/1962 | Fehn | 82/29.1 UX |
| 3,178,597 | 4/1965 | Bancroft | 82/29.1 UX |
| 3,190,156 | 6/1965 | Schuman | 82/29.1 UX |

FOREIGN PATENTS

| 859,847 | 12/1952 | Germany | 82/15 |
|---|---|---|---|
| 1,105,686 | 4/1961 | Germany | 82/24 |
| 929,033 | 6/1963 | Great Britain | 82/15 |

*Primary Examiner*—Andrew R. Juhasz
*Assistant Examiner*—Leon Gilden
*Attorney*—Robert E. Geauque ABSTRACT: A method and apparatus for producing a shell body of revolution with a substantially constant wall thickness comprising: Preparing the shell by accurately machining a surface concentric and perpendicular to the axis of the shell surface, the machined surface facilitating accurate alignment of the shell within the machining apparatus, cutting both the inside and outside surfaces of the shell simultaneously with the cutters at a fixed separation to maintain constant wall thickness; controlling the rotational velocity of the shell during machining with respect to the transverse movement of the cutters to maintain constant surface cutting speed by means of a pivotal eccentric cam operating upon at least one potentiometer.

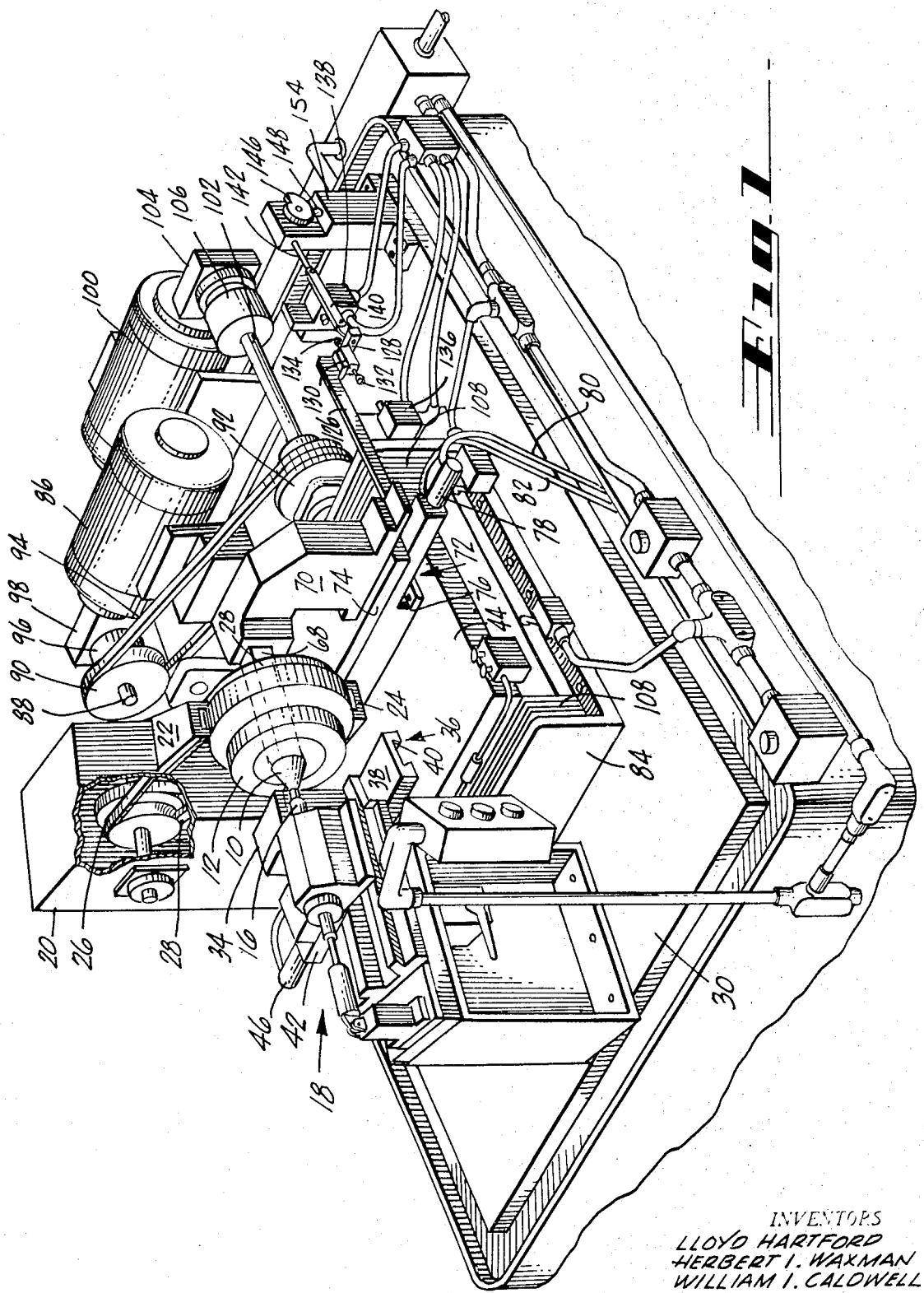

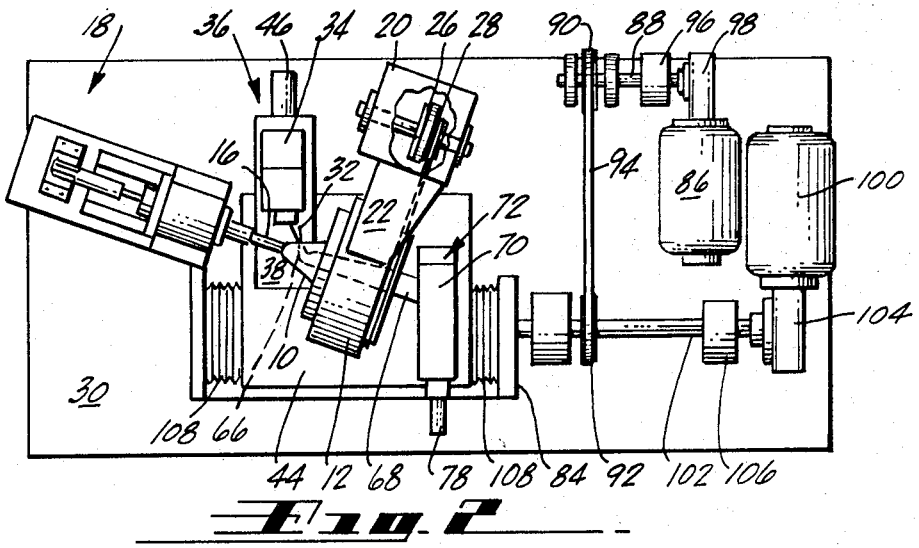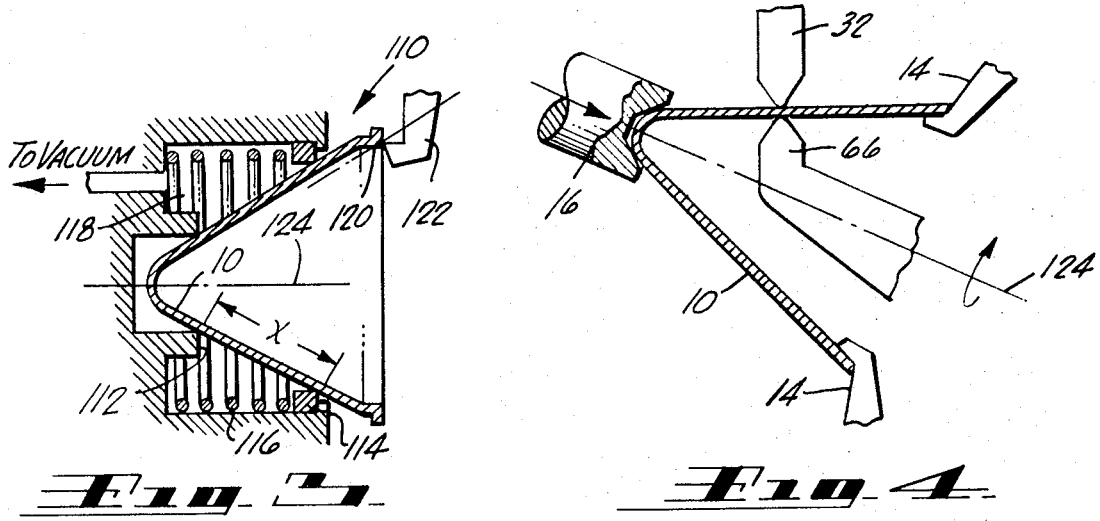

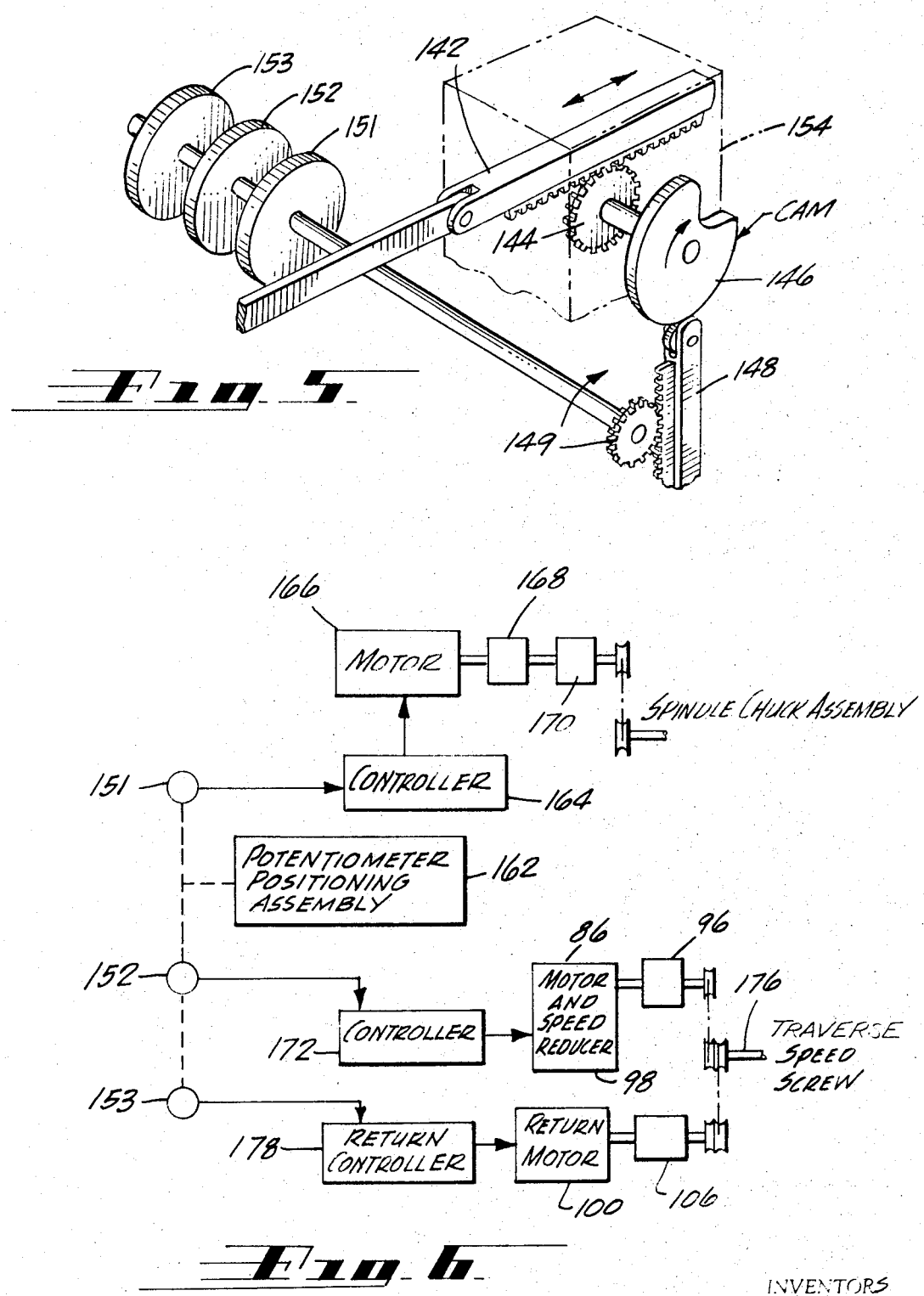

MACHINING ASSEMBLY

BACKGROUND OF THE INVENTION

In the design of shells made of metal, such as cylindrical members and cone shaped members and other bodies of revolution, there is requirement to produce the wall of the shell with small variations of wall thickness. Wall thickness variations degrade the performance of shaped charge liners. In such liners it is usually desirable to hold the wall thickness to ±0.0005 inches and the variations thereof to less than ±0.000 inches, Such shells may be produced in rough form from sheet material on a hydraulic press or using progressive dies to draw the material into the rough shape. The current practice to machine the surface is to mount the shell on a lathe with its axis parallel to the transverse axis of the lathe. A template and tracer is used to guide the cutting tool while machining the exposed surface. Then the shell is taken out of the machine and rechucked to expose the other surface. A template and tracer is used to guide the cutting tool while machining this other surface.

There are many disadvantages to this type of machining technique. First, inaccuracies result from deflection of the shell material itself during the cutting operation. Secondly, inaccuracies result from the change in angle of the axis and center of the shell with respect to the axis of the machine when the shell is rechucked. Thirdly, inaccuracies can result from differences in settings of the template used while cutting the two surfaces. Fourthly, inaccuracies will result from the inability of the cutting tools to follow the templates.

SUMMARY OF THE INVENTION

It has been found that the variations in wall thickness in a plane perpendicular to the axis of the shell, resulting; from deflection of material, from change in alignment resulting from rechucking between cutting the two surfaces and from the differences in alignments of the templates used while cutting the two surfaces, can be eliminated by cutting both the inner and outer surfaces of the shell simultaneously with opposing cutters which are held rigidly with respect to each other. This is the subject of a copending application by the same assignee.

For cutting conical surfaces, the variations in wall thickness along the slant height, resulting from the use of a template and tracer, can be eliminated by setting the axis of the work piece holder at the half-angle of the cone with respect to the direction of traverse of the cutting tools instead of using a template and tracer.

To accomplish the above objectives an apparatus has been designed to effect machining of both the inner and outer surfaces simultaneously of a cone shaped shell. Opposed cutters are rigidly mounted, the first cutter operating on the outer surface of the shell and the second cutter operating on the inner surface of the shell. The cutters are designed to move in a lineal direction while performing the cutting operations. To accomplish the machining technique of this invention the cone shaped shell is mounted so that both the base and the apex section of the cone are held securely. A chuck element holds the base portion of the cone with a live center element exerting a load force upon the apex portion. The live center elements hold the shell firmly against the chuck element. The cone axis is mounted at one-half the angle of the cone with respect to the transverse axis upon which the cutters are moved.

The chuck member is designed to rotate and effect rotating of the shell. As the chuck rotates, the shell rotates and the cutters feed along a straight line element of the cone. As both surfaces are being operated upon simultaneously, the deflection of the cone surface due to the contacting of a single cutter upon a surface is eliminated. The result is that, as both the interior and exterior surfaces are being cut simultaneously, wall thickness variance is only due to the tool wear. As the cutters move lineally, the diameter of the cutting circle increases. Also, as the diameter increases so does the cutting surface speed. To minimize operating time and obtain a good surface finish, it is desirable to use a constant surface cutting speed. Therefore, the apparatus of this invention includes structure to decrease rotational speed of the shell as the diameter of the cutting surface increases. Therefore, a correlation is obtained between the rotational chuck speed and of the rate of lineal movement of the cutters. Basically, an apparatus is employed where as the cutters move along the shell a cam is pivoted which causes a potentiometer assembly to decrease voltage. The decrease in voltage results in a decrease of the rotational speed of the chuck which causes rotation of the shell. It is also desirable to obtain the same width of cut during the entire cutting length. If only the chuck spindle speed is reduced, the cut width becomes larger as the cutters act on an ever increasing diameter. Therefore, the potentiometer assembly also causes the rate of transverse movement to proportionally decrease. The rate of decrease of the chick spindle speed and the transverse speed are dependent so as to achieve a constant cutting width.

Another portion of the invention relates to the mounting of the cutters. Each of the cutters is mounted upon a movable dovetail assembly. The working position of each cutter can be accurately predetermined by a micrometer and a stop element. When it is desired to place the cutters to effect the cutting procedure, hydraulic actuators force the supporting members of each of the cutters adjacent the stop element, therefore the gap located between the opposed cutters can be determined with a high degree of accuracy and maintained during the entire cutting procedure.

Prior to the placing of the cone shaped shell within the machining apparatus, the shell is prepared to insure accurate alignment. The preparing apparatus for the base of the cone uses a vacuum chuck which has a fixed gauge ring and a floating gauge ring. The fixed gauge ring's diameter is concentric with the axis of the vacuum chuck. The floating gauge ring is constrained to move parallel to the axis of the vacuum chuck with its gauge diameter concentric with the vacuum. When the cone is held in the chuck by the vacuum it is positioned with respect to the chuck axis by contact with the two ring's gauge diameters. While it is held in the chuck a beveled surface is machined on the base of the cone. This surface is concentric with the perpendicular to the cone axis defined by the gauge diameters of the two rings. The beveled surface is cut to mate with a corresponding surface on the chuck assembly of the machining apparatus. Upon the cone being installed in the chuck assembly, the preparation of the base of the cone results in uniform removal of material from the surfaces of the cone which improves the surface finish.

One object of the apparatus of this invention is to design a machine which can machine a shell member with a high degree of accuracy.

Another object of this invention is to provide a novel cutting assembly in which opposed cutters are employed to operate upon both the inner and outer surface of the shell member.

Another object of this invention is to support each of the cutters in a novel supporting arrangement.

Another object of this invention is to design a machine which can effect machining of a cone shaped surface wherein the surface cutting speed is maintained constant.

Another object of this invention is to provide a novel supporting arrangement for the shell during the time in which it is being machined.

Another object of this invention is to provide for an automatic, accurate and simple means of positioning the cutting tools.

Another object of this invention is to provide a novel apparatus to prepare the shell prior to its surfaces being machined.

Another object of this invention is to provide a novel method to accurately machine both the inner and outer surfaces of the cone shaped shell.

Although this invention has been discussed in connection with a cone-shaped shell, it is to be understood that this invention, although having particularly advantageous results in producing coneushaped shells, may be readily employed to machine surfaces of other configurated shells. Other advantages of this invention not specifically enumerated above are believed to become apparent as the description of this invention proceeds.

BRIEF DESCRIPTION OF THE DRAWINGS

FIG. 1 is an overall perspective view of the machining apparatus of this invention showing the cutter arrangement and the novel workpiece-supporting apparatus of this invention.

FIG. 2 is a plan view of the novel workpiece-holding assembly of this invention which is shown in the overall environment of FIG. 1.

FIG. 3 is a cross-sectional view of the base preparing apparatus of this invention which prepares the workpiece to insure accurate alignment within the workpiece holder of FIG. 2.

FIG. 4 is a schematic, partly in section, view showing in detail the workpiece-holding assembly and the opposed cutter arrangement of this invention.

FIG. 5 is a perspective view depicting the linkage apparatus of this invention to maintain a constant surface cutting speed;

FIG. 6 is a block diagram of the electrical components of this invention and their relation to the associated mechanical structure which is necessary to maintain the cutting speed constant.

DETAILED DESCRIPTION OF THE SHOWN EMBODIMENT

Figure 7:
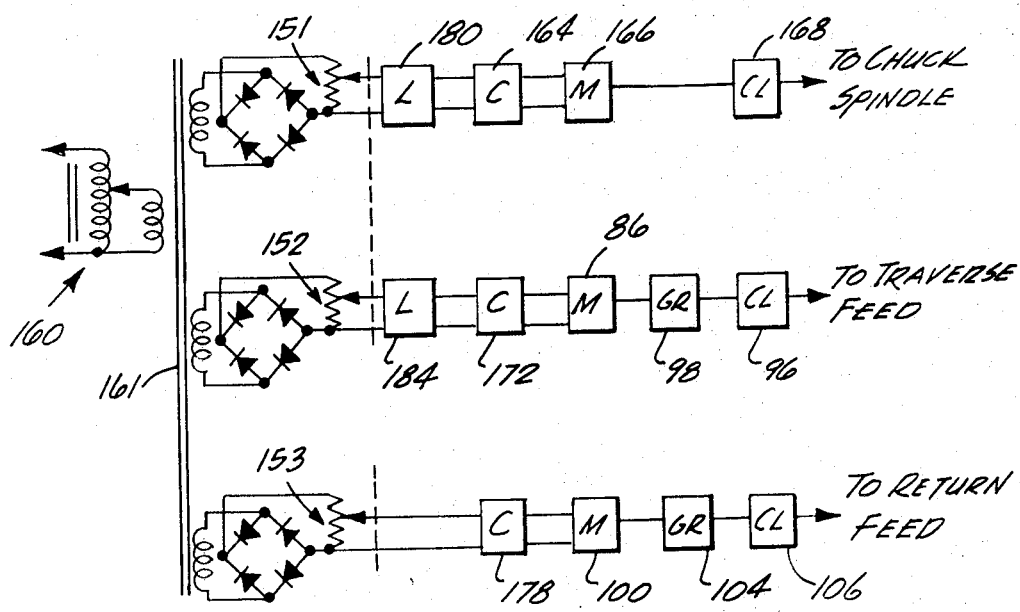
FIG. 7 is more detailed block diagram of the electrical components shown in FIG. 6.

Referring particularly to the drawing, there is shown in FIG. 1 a perspective view of the machine structure to effect the cutting operation of the workpiece 10. Workpiece 10 is shown located with respect to a spindle chuck assembly 12 by means of the chuck 14. A live center 16 is adapted to matingly cooperate with the nose portion of the workpiece 10. Live center 16 is being constantly pressed against workpiece 10 by a hydraulic actuator assembly 18. Spindle chuck assembly 12 is fixedly secured to housing 20 through brackets 22 and 24. Housing 20 has rotatably mounted therein a pulley 26. Power is capable of being transmitted from pulley 26 to the chuck assembly 12 though a belt 28. Belt 28 causes rotation of the spindle chuck assembly 12 which in turn causes rotation of the workpiece 10. Housing 20 is fixedly secured to the machine base 30. Power is supplied to the pulley through an appropriate electrical motor (not shown). It is to be noted that upon rotation of the workpiece 10, the live center 16 is so mounted within bearings (not shown) to also permit its rotation.

An outside cutter 32 is adapted to contact the exterior surface of workpiece 10 and is fixedly secured to outer tool holder 34. Outer toolholder 34 comprises a block of a rigid metallic material. Upon holder 34 being positioned upon a cross-slide assembly 36, the amount of movement of the cutter 32 with respect to the assembly 36 is so small as to be considered negligible. This rigid mounting of the cutter 32 is necessary to insure accurate machining of the workpiece 10. Cross-slide assembly 36 basically comprises a movable member 38 which cooperates through a dovetail slot 40 with a fixed member 42. Member 42 is fixedly secured to the traverse carriage 44. Movable member 38 is moved by means of a hydraulic actuator 46.

Figure 8:
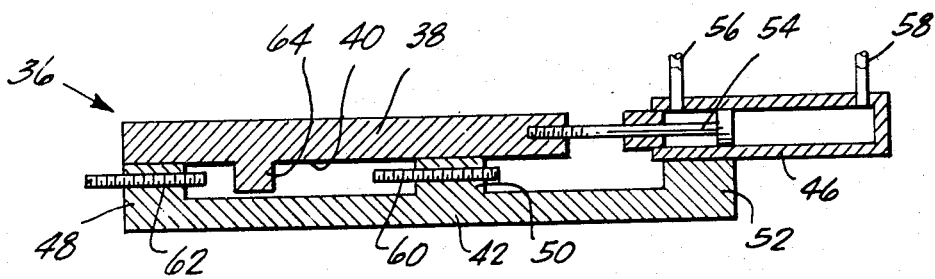
FIG. 8 is a cross-sectional side view of the dovetail holding assembly of this invention showing the accurate setting mechanism for each cutter.

Referring to FIG. 8 of the drawings for a more detailed showing of the cross-slide 36, fixed member 42 includes three upstanding elements 48, 50 and 52. Upstanding element 52 is fixedly secured to the hydraulic actuator 46. Actuator 46 includes a piston 54 which is secured to movable member 38, piston 54 being movable due to variations in the hydraulic pressure applied through the lines 56 and 58 thereby causing movement of movable member 38. Upstanding member 50 cooperates with the dovetail slot 40 and includes a longitudinal set screw 60. Upstanding member 48 cooperates with dovetail slot 40 and includes a longitudinal set screw 62. Movable member 38 includes a depending portion 64 which is capable of contacting both set screws 60 and 62. It is apparent that setscrews 60 and 62 function as movement limiters of movable member 38. Setscrew 60 functions to limit the rearward movement of the movable member 38, and therefore outside cutter 32 (rearward movement being defined as a direction away from the workpiece 10). Setscrew 62 functions to limit the forward movement of the movable member 38 and likewise establish the position of outside cutter 32. It is in this position that cutter 32 operates upon the workpiece 10. Therefore, as it is absolutely necessary that accurate placement of the cutter 32 in the forward position, the setting of setscrew 62 is accomplished by means of micrometers. In actual practice the setting of setscrew 62 and subsequently the cutter 32 is at a tolerance of 0.0002. It is to be noted that cross-slide assembly 36 permits movement of the cutter 32 in a direction perpendicular to the surface of the workpiece 10 at its point of contact.

An inside cutter 66 is so positioned as to be in line with the outside cutter 32 but adapted to contact the interior surface of workpiece 10. Cutter 66 is supported by an arm 68 which is fixedly secured to an inner toolholder 70. It is to be noted that toolholder 70 is mounted in a manner similar to the mounting of toolholder 34, that is, upon a cross-slide assembly 72 which includes a movable member 74 and a fixed member 76. The arrangement between member 74 and fixed member 76 is a dovetail slot arrangement which includes spaced set screws (not shown). The movable member 74 is moved relatively to the fixed member 76 by means of a hydraulic actuator 78 which is supplied with fluid under pressure through lines 80 and 82. Fixed member 76 is secured to the traverse carriage 44 as is fixed member 42. The mounting of fixed member 76 with respect to the traverse carriage 44 is such that cutter 66 is also capable of movement only in a direction perpendicular from the surface of the workpiece 10 at its point of contact. It is to be readily apparent that the setting of inside cutter 66 is also done with extreme accuracy in the same manner as outside cutter 32.

Traverse carriage 44 is movable within a bed assembly 84 in a direction which permits the cutters 32 and 66 to move lineally across the surface of the workpiece 10. Bed assembly 84 includes a lead screw (not shown) which facilitates movement of the carriage 44. The lead screw is driven in one direction by the feed motor 86 which operates through a pulley 90, on a shaft 88, pulley 90 causing rotation of pulley 92 through belt 94. Mounted on shaft 88 and between pulley 90 and the feed motor 86 is a clutching assembly 96. Mounted between clutching assembly 96 and feed motor 86 is an adjustable speed reducer 98.

A return motor 100 operates through a shaft 102 which causes rotation of the lead screw of the bed 84 in a direction opposite to the rotation imparted by motor 86. Return motor 100 drives shaft 102 through a speed reducer 104 and a clutching assembly 106. It is to be noted that the mounting of the carriage 44 with respect to the bed assembly 84 includes a two-element bellows assembly 108 therebetween. The function of the bellows 108 is common knowledge in the machining art, that being to prevent workpiece shavings from contacting the lead screw of bed 84.

Prior to the mounting of workpiece 10 within the spindle chuck assembly 12, its base is prepared in such a manner as to insure that its mounting is extremely precise. To insure such accurate alignment the base preparation apparatus 110 shown in FIG. 3 is employed. Apparatus 110 includes an annular inner fixed ring 112 which is to surround the nose portion of the cone shaped workpiece 10. A floating ring 114 is biased by means of a spring 116 to contact the workpiece 10 in a spaced relationship with fixed ring 112. The distance X representing the distance between floating ring 114 and the fixed ring 112 represents the portion of the workpiece 10 which is to be machined. With the workpiece so installed adjacent fixed ring 112 and floating ring 114, a vacuum is applied thereabout into chamber 118 (from a source not shown). The applying of the vacuum causes the workpiece to be aligned within the preparation apparatus. The bias of spring 116 is selected at a value in relation to the vacuum pressure so that the floating ring 114 insures the accurate alignment of the workpiece 10. With the workpiece 10 so installed, a surface 120 is machined upon the base portion of the workpiece 10 by a cutter 122. The surface 120 is concentric with the cone axis 124. The accuracy at which surface 120 is machined is such that, upon the installation of the workpiece 10 within the spindle chuck assembly 12, any error in alignment is negligible. Further, upon the cutting of both the inner and outer surface of the workpiece 10 by the cutters 32 and 66 a high degree of accuracy is achieved as aforementioned. It is believed to be apparent that surface 120 is to contact chuck 14 of the chuck spindle assembly 12, chuck 14 being also formed to a high degree of accuracy, insuring accurate alignment of the workpiece 10.

To minimize operating time and to obtain a good surface finish, it is desirable to use a constant surface cutting speed. However, when cutting a cone shaped workpiece in the manner shown in FIG. 4 of the drawings, as the cutters move transversely, the surface speed increases due to the larger cutting diameter with respect to the axis of rotation of the workpiece. Referring particularly to FIGS. 1 and 5 of the drawings, structure is included which is to maintain a constant surface cutting speed when machining a shell. Fixedly secured to 44 is an extending arm 126 which is connected to a bar 128. Mounted on bar 128 is a block 130 which has a pair of adjustable screws 132 and 134 extending from block 130 on opposite sides there and in substantially transverse alignment. Screw 132 is to contact a first microswitch 136 and screw 134 is to be contactable with a second microswitch 138. When the microswitches are operated they disconnect the power to the motors that drive the lead screw and perform other functions which will be described later.

Connected to bar 128 is connecting member 140. Connecting member 140 is pivotably connected with respect to bar 128 so that movement in a substantially vertical plane is permitted. Pivotably connected in the same manner to connecting member 140 is a rack 142. Rack 142 operates upon a gear 144 which in turn effects rotation of the cam 146. A follower 148 is movable by cam 146 in a substantially vertical direction. Follower 148 is movable by cam 146 in a substantially vertical direction. Follower 148 has teeth which mate with gear 149 to position the arms of potentiometers 151, 52, and 153. Rack 142, gear 144, cam 146, follower 148, gear 149 and potentiometers 151, 152 and 153 are all supported by housing 154. Housing 154 is securely affixed to the machine base 30. Rotation of the arms of the potentiometers varies the electrical potential thereon. Potentiometers 151 and 152 provide the command voltages for the rotational speed of the spindle chuck assembly 12 and for the feed motor 86. The potentiometers 151 and 152 are ganged together and positioned by cam 146. The cam 146 is cut so that the setting of the potentiometers 151 and 152 is inversely proportional to the diameter of the workpiece that is being machined, i.e., as the cutters are fed along the workpiece surface and the cutting diameter increases, the speed of the feed motor 86 and the chuck spindle motor decreases so as to maintain a constant surface cutting speed and constant cutting width. The voltage outputs of potentiometers 151 and 152 are proportional to the setting of autotransformer 160. The autotransformer 160 is employed to vary the cutting speed. The surface finish depends upon the cutting tools, the material being cut and the surface speed. Once the desired cutting surface speed is set, it is maintained constant through the use of potentiometers 151 and 152 as aforementioned.

Referring to FIG. 6 of the drawing, the potentiometer positioning assembly 162 is a broad term for the mechanism shown in FIG. 5. Its relationship to the potentiometers 151 and 152 is clearly shown. Potentiometer 151 supplies the speed command voltage to controller 164 which causes chuck spindle motor to rotate at a speed proportionate to the command voltage to controller 164 which causes chuck spindle motor to rotate at a speed proportionate to the command voltage. Motor 166 operates through a clutch 168 to cause rotation of the spindle chuck assembly 12. Brake 170 is used to stop the spindle chuck. Potentiometer 152 supplies the command voltage to controller 172 to operate the feed motor 86 and its associated speed reduction mechanism 98. Feed motor 86 likewise operates through clutching assembly 96 to control the movement of the lead screw 176 of the bed 84. Potentiometer 153 supplies the command voltage for return controller 178 which governs the speed of return motor 100. Return motor 100 operates through clutch 106 to operate lead screw 176. Motors 86 and 100 operate lead screw 176 in opposite directions. Conventional logic circuitry (not shown) is used to prevent power from being applied to motors 86 and 100 at the same time. Clutches 96 and 106 are used to prevent either of motors 96 and 106 from driving the other. Conventional logic circuitry (not shown) is used to prevent clutches 96 and 106 from being actuated at the same time.

Referring to FIG. 7 of the drawings, autotransformer 160 is supplied with AC voltage. It supplies voltage to potentiometers 151, 152 and 153 through an isolation transformer 161 and rectifier circuits. The isolation transformer is used to prevent undesired interaction between controllers 164, 172 and 178. The rectifiers convert AC voltage to pulsating DC voltage. The voltage to controller 164 is prevented from exceeding a preselected value by voltage limiter 180. It has been found that when very small diameters are being cut, the spindle chuck assembly speed which is necessary to maintain constant surface cutting speed may exceed the speed limit of the spindle. It is for this reason that the voltage limiter 180 is employed to prevent the spindle speed from exceeding a certain value. Voltage limiter 180 is connected to a motor speed control 164, motor 166, and the clutch and brake assemblies 168 and 170 to cause rotation of the spindle chuck assembly 12. Potentiometer 152 also supplies voltage through a voltage limiter 184 and then to a controller 172. Controller 172 governs the speed of motor 86 which motor acts through adjustable speed reducer 98 and clutch 86 to cause movement of the carriage 44. Adjustable speed reducer 98 is used to change the rate of movement of carriage 44 with respect to the speed of rotation of the spindle chuck assembly 12. Adjustment of 98 changes the width of cut. Voltage limiter 184 is set to limit the rate of movement of carriage 44 when the speed of rotation of spindle chuck assembly 12 is limited. This results in the width of cut being the same when the spindle chuck assembly speed is limited as when it isn't limited.

Potentiometer 153 is used to effect operation of return motor 100. Potentiometer 153 supplies a command voltage to return controller 178 which governs the speed of return motor 100. The motor 100 acts through speed reducer 104 and clutch assembly 106. The return motor potentiometer 186 is arranged such that a fast return is provided initially and the potentiometer reacts with respect to the cam 146 to slow down the rate of feed to prevent overshoot at the end of the return.

The operation of the apparatus of this invention is as follows: It is presumed that there is a plurality of cone shaped workpieces 10 which need to have their inner and outer surfaces machined. First, each workpiece 10 is prepared through the apparatus shown in FIG. 3, resulting in accurately machined surface 120 being formed on the base of the workpiece 10. With the workpiece 10 being so prepared, it is then ready for installation in the machining apparatus. Prior to installation of the workpiece 10, chuck assembly 12 and the hydraulic actuator assembly 18 are located in an in-line relationship to hold the workpiece 10. The in-line relationship is established to be one-half of the cone angle of the workpiece 10 with respect to the direction of movement of bed 44. The cutters 32 and 66 are set with respect to the center line of the workpiece surface to give the desired wall thickness. The cross slide assembly to effect the setting of each of the cutters 32 and 66 is shown in FIG. 8 of the drawing. The limits of traverse movement of the cutters 32 and 66 are established through adjusting screws 132 and 134 to operate the first and second microswitches 136 and 138, respectively. The desired surface cutting speed is set by means of autotransformer 160, this cutting speed to remain constant during the cutting procedure. The width of cut is set by adjusting speed reducer 98, the cutting tools are moved to the loading position which is adjacent to the chuck and moved away from the work. At this point the machine is ready for operation and the workpiece 10 is prepared. The cone shaped workpiece 10 is then installed so that the chuck 14 holds the base thereof and the live center 16 of the actuator assembly 18 pushes against the nose portion of the workpiece.

The operation of the machine will now be described. The machine is provided with a logic circuit which causes the operations to be performed in the proper sequence. The logic circuit details will not be given since the circuit could be set up by one versed in the state of the art. After loading the machine, the start button is actuated and all operations proceed automatically until the machining is completed and the work is ready to be removed.

When the start button is operation, motor 100 moves carriage 44 in the direction of the apex of the cone with the tools not contacting the work. When screw 132 actuates switch 136, return motor 100 is stopped and clutch 106 disengaged. Then the motor assembly is actuated which causes rotation of the chuck spindle assembly 12, resulting in rotation of workpiece 10 about its axis, the cross slide hydraulic actuators move both the tool holders towards the workpiece until the tool holder slides are stopped by their respective stops, which makes the gap between the cutting edges equal to the machined thickness of the work and the feed motor 86 and clutch are activated which causes traverse carriage 44 to move in such a direction as to cause cutters 32 and 66 to move towards the base of workpiece 10. To maintain a constant surface cutting speed and cutting width, the speed of motor 86 is decreased as well as chuck spindle motor 166 through the action of the potentiometer positioning assembly and associated motor controllers.

Upon the cutters 32 and 66 reaching the limit of their forward movement, adjusting screw 134 operating upon second microswitch 138 effects stopping of the motors 86 and 166 and the retraction of the cutters 32 and 66 to the loading position. Workpiece 10 can then be replaced.

It is to be understood, therefore, that numerous modifications and variations of the present invention are possible in the light of the above teachings, as will be readily apparent to those versed in the art, without departing from the spirit and scope of the present invention as set forth in the appending claims.

We claim:

1. An apparatus for cutting both the inner and outer surfaces simultaneously of a cone-shaped shell comprising:
    a chuck assembly for rotatingly supporting said cone-shaped shell;
    first and second cutters being mounted in a facing relationship with the surfaces of the cone-shaped shell therebetween, the cutting angle of said cutters being in substantial alignment and substantially perpendicular to said cone-shaped shell at the point of contact;
    said cone-shaped shell being mounted at one-half its cone angle with respect to the direction of cutter movement;
    operating means for simultaneously moving said cutters along the surfaces of said cone-shaped shell, the direction of movement of said cutters being in alignment with the line contact of said cutters with said cone-shaped shell;
    each of said cutters being supported upon a slide assembly, each slide assembly including a movable element being adjustable between a first and second position with respect to a fixed element, said first position placing each of said cutters into contact with its respective surface and equidistant from the center line of the wall thickness of said cone-shaped shell, adjustment means being attached to each of said fixed elements to accurately locate the first position of said cutters, said second position of said cutters defining the maximum amount of movement of said cutters away from said cone-shaped shell;
    an actuator being secured to each of said fixed elements and functioning to effect movement of its respective movable member, upon initial operation of said entire apparatus said actuators causing said cutters to move to said first position and maintain said cutters therein during the cutting operation;
    structure for maintaining the surface cutting speed constant;
    said structure including a potentiometer assembly comprising at least one potentiometer, said potentiometer assembly being responsive to the longitudinal position of said cutters relative to said shell to maintain said surface cutting speed constant.

2. An apparatus for machining the inner and outer surfaces of a cone-shaped shell comprising:
    supporting means for locating said shell;
    variable-speed rotation means for rotating said shell in a position such that the axis of rotation of said shell coincides with the cone axis;
    cutting means comprising a pair of cutters for simultaneously cutting both the inner and outer surfaces of said shell;
    positioning means causing the movement of said cutting means to be lineal and at an angle to said axis of rotation equal to one-half the cone angle of said shell, said pair of cutters being spaced apart a constant amount during the lineal movement of said cutters along the surface of said shell; and
    means for maintaining a constant cutting surface speed, said maintaining means being responsive to the longitudinal position of said cutting means relative to said shell and controlling the speed of said rotating means.

3. An apparatus as defined in claim 1 comprising:
    control means for maintaining a constant cutting width, said control means being responsive to the longitudinal position of said cutting means relative to said shell and controlling the lineal speed of said cutting means produced by said positioning means.

4. An apparatus as defined within claim 3 wherein:
    said maintaining means and said control means comprise a potentiometer assembly, said potentiometer assembly including at least two in number of potentiometers, one of said potentiometers controlling the speed of said rotation means and the other controlling the lineal speed of said cutting means.

5. Apparatus as defined within claim 4 comprising:
    a third potentiometer included within said potentiometer assembly, said third potentiometer being connected to a return motor, said return motor functioning to move said cutting means in the direction wherein the distance of the cutting means decreases from the axis of rotation of said shell, said third potentiometer producing a decrease in the return speed to prevent overshoot.

6. An apparatus as defined in claim 2 wherein:
    said maintaining means comprises potentiometer means for continually sensing the longitudinal position of said cutters relative to said shell, said potentiometer means producing a signal in accordance with said longitudinal position to adjust the rotational speed of said shell to maintain the cutting speed constant along the surface of said shell.

7. An apparatus as defined in claim 6 wherein:

second means responsive to the longitudinal position of said cutters to effect variations in the speed of lineal movement of said cutters to maintain equal width of cut.

8. An apparatus as defined in claim 6 wherein:
said potentiometer assembly includes at least two potentiometers, one of said potentiometers controlling the speed of said chuck assembly and the other controlling the lineal speed of said cutters.

9. An apparatus as defined in claim 6 wherein:
said structure including a cam, said cam being pivoted in one direction as the distance of said cutters increases from the axis of rotation of said shell, said cam causing lineal movement of a follower, said follower causing a variation of the electrical resistance of said potentiometer assembly, thereby causing a decrease in the rotating speed of said chuck assembly and a decrease in the lineal speed of said cutters.

10. An apparatus as defined in claim 9 wherein:
a linkage assembly connects said operating means with said cam, path movement limiting means connected to said linkage assembly and capable of causing operation of electrical switching structure to effect operation of the electrical motors which move said cutters.

11. An apparatus as defined in claim 10 wherein:
said path movement limiting means being adjustable.

12. An apparatus as defined in claim 8 wherein:
A third potentiometer being included within said potentiometer assembly, said third potentiometer being connected to a return motor, said return motor functioning to move said cutters in the direction wherein the distance of said cutters decreases from the axis of rotation of said shell, said third potentiometer causes a decrease in the return speed to prevent overshoot.

13. An apparatus for machining the inner and outer surfaces of a cone-shaped shell comprising:
supporting means for locating said shell;
variable-speed rotation means for rotating said shell in a position such that the axis of rotation of said shell coincides with the cone axis;
cutting means comprising a pair of cutters for simultaneously cutting both the inner and outer surfaces of said shell;
positioning means causing the movement of said cutting means to be lineal and at an angle to said axis of rotation equal to one-half the cone angle of said shell, said pair of cutters being spaced apart a constant amount during the lineal movement of said cutters along the surface of said shell; and
control means for maintaining equal width of cut, said control means being responsive to the longitudinal position of said cutting means relative to said shell and controlling the lineal speed of said cutting means produced by said positioning means.

14. An apparatus as defined in claim 1 wherein:
said potentiometer assembly further effects variations in the lineal movement of said cutters to maintain equal width of cut.

* * * * *